United States Patent [19]

Buss et al.

[11] 4,080,434

[45] Mar. 21, 1978

[54] METHOD FOR CONTROL OF CARBON BLACK REACTOR

[75] Inventors: Russel A. Buss; Galen D. Stacy, both of Bartlesville, Okla.

[73] Assignee: Phillips Petroleum Company, Bartlesville, Okla.

[21] Appl. No.: 715,368

[22] Filed: Aug. 18, 1976

Related U.S. Application Data

[62] Division of Ser. No. 429,138, Dec. 28, 1973, Pat. No. 3,993,447.

[51] Int. Cl.² .............................................. C09C 1/48
[52] U.S. Cl. .................................... 423/450; 23/259.5
[58] Field of Search ............. 23/253 A, 230 A, 259.5; 431/89, 90; 236/15 E; 423/450–458; 208/DIG. 1 AC; 235/151.12, 151.12 MC; 432/23; 34/46; 73/29

[56] References Cited

U.S. PATENT DOCUMENTS

| 2,030,140 | 2/1936 | Day ..................................... 431/90 X |
| 2,344,027 | 3/1944 | Conner .................................. 423/452 |
| 3,095,728 | 7/1963 | Kindred et al. .................... 73/190 X |
| 3,350,173 | 10/1967 | Colby, Jr. et al. ............... 23/259.5 X |
| 3,374,950 | 3/1968 | Menzel et al. ................. 236/15 E X |
| 3,390,960 | 7/1968 | Forseth ............................ 23/259.5 X |
| 3,592,599 | 8/1968 | Gohlke et al. ........................ 423/450 |
| 3,730,157 | 5/1973 | Gerhold ........................... 60/276 UX |

FOREIGN PATENT DOCUMENTS 715,403   9/1954   United Kingdom ................. 423/458

OTHER PUBLICATIONS

Sovas, E. S., Computer Control of Industrial Processes, N.Y., McGraw-Hill, 1965, pp. 18, 49–54, 344–345.

Primary Examiner—R.E. Serwin

[57] ABSTRACT

In a carbon black production system having a reactor with a combustion zone and a reaction zone, substantial uniformity of the carbon black produced by the reactor is maintained by regulating the flow of fuel to the combustion zone in response to a signal representative of the temperature within the combustion zone. As an alternative to, or in conjunction with, control in response to a signal representative of the combustion zone temperature, the flow of fuel to the combustion zone can be regulated in response to a signal representative of the rate of combustion heat released by the fuel entering the combustion zone.

7 Claims, 1 Drawing Figure

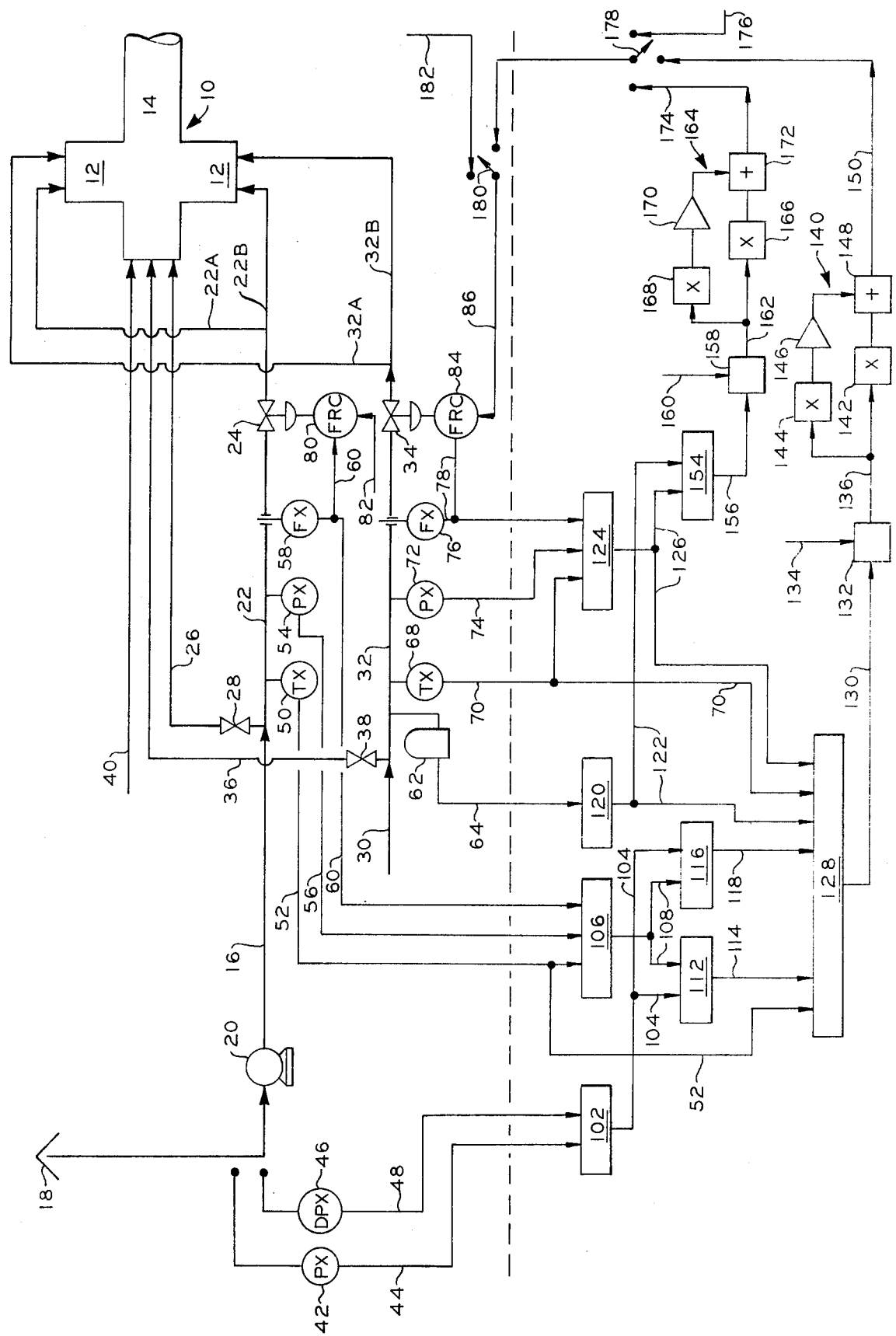

METHOD FOR CONTROL OF CARBON BLACK REACTOR

This application is a division of copending application Ser. No. 429,138 filed Dec. 28, 1973, now U.S. Pat. No. 3,993,447.

This invention relates to a method and apparatus for controlling a carbon black reactor. In another aspect it relates to a method and apparatus for controlling the temperature within the combustion zone of a carbon black reactor having both a combustion zone and a reaction zone. In still another aspect the invention relates to a method and apparatus for providing a uniform carbon black reactor product by maintaining a substantially constant temperature in the combustion zone of a carbon black reactor having a combustion zone and a reaction zone. In yet another aspect the invention relates to the production of a uniform carbon black reactor product by maintaining the rate that combustion heat is released by the fuel gas delivered to the combustion zone of a carbon black reactor at a constant level. In another aspect the invention relates to a method and apparatus for determining the combustion temperature within the combustion zone of a carbon black reactor. In yet another aspect the invention relates to method and the apparatus for determining the rate at which combustion heat is released by fuel delivered to a combustion zone.

Various types of carbon blacks are produced on a large scale by thermal decomposition of gaseous or liquid hydrocarbons. Such a process comprises decomposing the hydrocarbons of the fed by heat generated from the burning of a portion of a hydrocarbon feed and/or decomposing the hydrocarbon feed by subjecting the feed to heat generated by the substantially complete combustion of a second, generally different, hydrocarbon feed. In any given carbon black reactor or furnace employing a particular hydrocarbon feed, the uniformity of quality as well as the yield of the carbon black produced in the reactor are related to the ratios of feed rates of the reactants, the geometric configuration of the reactor, the individual physical and chemical properties of the reactants, the operating conditions of the reactor, and other similar conditions. The useful characteristics of a carbon black are generally expressed in terms of the particle size, surface chemistry, and structure of the carbon black. Due to the many variables which affect the useful properties of the carbon black being produced in a reactor, and the comparatively delicate balance which must be maintained among the various factors determinative of carbon black properties, a reactor producing a specified carbon black under continuing nominally uniform reaction conditions may produce an off-specification product as the result of relatively slight variations in weather conditions, reactant composition or other similar factors. In addition to off-specification product caused by uncontrollable variations in reactant properties and/or reaction conditions, the necessity for changing to a fuel of significantly different composition, such as a change from a predominantly methane gas to a "wet" gas, during a production run has been extremely difficult to accomplish without producing a substantial amount of off-specification product.

In a carbon black reactor having a combustion zone and a reaction zone one of the factors which will have a decided effect on the properties of the carbon black produced is the temperature of the gases generated in the combustion zone. These gases from the zone provide at least a substantial portion of the heat of reaction required to convert the reactor feed into carbon black. Direct measurement of the temperature of the combustion reaction taking place inside the tangential combustion zone has been extremely difficult to accomplish, however, and has been impractical if not impossible to implement on a continuing, long-term basis. The temperatures inside the combustion zone ordinarily fall within a range of a few hundred degrees above or below 3000° F. The flow of combusting gases within the combustion zone is turbulent, and the temperature at different points within the combustion zone at any specific time are nonuniform since the fuel and air introduced at the outside of the combustion zone at relatively high flow rates simultaneously combust and continue to flow toward the reaction zone of the reactor. In a reactor having a tangential combustion zone and an axial reaction zone, for example, the combustion gases spiral toward the reaction zone during and/or directly after combustion. Measurement of the effective or average temperature within the combustion zone by common pyrometric techniques is not practical since thermocouples or other similar probes placed inside the combustion zone, while useful for a relatively short period of time, have a limited life in the extremely hostile environment due to the turbulence and high temperatures to which they are continuously subjected. Use of an optical or radiation pyrometer is impractical for obtaining accurate effective or average temperature measurements within the combustion zone due to the turbulence of gases of varying temperatures and the shielding effect caused by gases near the outside of the combustion zone being at a temperature different from the combustion gases spiraling toward the axial reaction zone of the reactor.

Accordingly, it is an object of the invention to provide a method and apparatus for control of a carbon black reactor. Another object of the invention is to provide a method and apparatus for controlling the temperature of the combustion zone of a carbon black reactor having a combustion zone and a reaction zone. An additional object of the invention is to provide a method and apparatus for continuing maintenance of the production of uniform carbon black properties in a carbon black reactor having a combustion zone and a reaction zone. Yet another object of the invention is to provide a method and apparatus for controlling the rate at which combustion heat is released by fuel introduced into a combustion zone. Yet another object of the invention is to provide a method and apparatus for determining the temperture within a combustion zone without direct measurement thereof. Another object of the invention is to provide a method and apparatus for determining the rate at which combustion heat is released by fuel being introduced into a combustion zone.

In accordance with the invention a method and apparatus is provided for predictively determining, from the compositions and flow characteristics of the air and fuel systems introduced into the combustion zone of a carbon black reactor, the effective temperature within the combustion zone, the amount of heat available in the fuel entering the combustion zone, or both, and controlling the flow of fuel or air or both fuel and air into the combustion zone in response to one or more of these determinations. Practice of the invention makes it possible to determine the effective temperature of the combustion zone to the same precision as physical measurement of the combustion zone temperature using a thermocouple without the high cost of maintaining such relatively short-lived flame temperature measurement equipment in a condition to provide temperature readings of high accuracy. Use of the combustion zone temperature to control the carbon black reactor is advantageous in that it permits compensation for various process stream disturbances by manipulation of as few as one process variable. The invention is discussed herein primarily with respect to a preferred embodiment wherein the combustion zone fuel flow rate is the manipulated variable. Other variables or more than one variable could be manipulated to accomplish substantially the same result.

Although the invention is described herein in conjunction with control of the temperature within a carbon black reactor having a tangential combustion zone and an axial reaction zone, the method and apparatus used to determine the combustion zone temperature would be equally applicable to the determination of temperature within any combustion or other exothermic reaction zone wherein the ignition of fuel and air or other combination of reactants results in substantially complete combustion of the fuel or complete conversion of a reactant and the amount of heat lost by the combustion or reaction products to the surrounding environment by radiation or convection is negligible compared to the amount of heat carried by the products of combustion or reaction and other materials from the combustion or reaction zone under continuous operating conditions. Although the preferred method and apparatus described herein are adapted primarily for use with a fuel gas combustion zone feed, the invention can be readily adapted for use in a reactor employing a liquid hydrocarbon combustion zone fuel. Implementation of the invention requires accurate measurement of tangential air and tangential fuel temperatures, pressures, and flow rates, as well as atmospheric conditions and fuel gas composition. In accordance with the invention these parameters are continuously and automatically monitored to provide standard dry air flow measurement, standard gas flow measurement, standard water vapor flow as a result of humidity in the air, air temperature, fuel gas temperature, and fuel gas heating valve, from which the temperature of the combustion zone can be predictively determined.

Additional objects and advantages of the invention will be apparent from the following description of the drawing in which the single FIGURE schematically illustrates a carbon black reactor controlled by the method and apparatus of the invention.

Referring now to the FIGURE in detail, there is illustrated by schematic representation a carbon black reactor 10 having a tangential combustion zone 12 encircling a portion of an axial reaction zone 14. A main air supply conduit 16 provides process air from ambient air intake 18 and compressor 20 to the reactor 10. Tangential combustion air is supplied to tangential combustion zone 12 by tangential air supply conduit 22 through tangential air control valve 24. Downstream of tangential air control valve 24 the tangential air supply conduit 22 divides into tangential air supply conduits 22A and 22B to permit introduction of tangential combustion air to the tangential combustion zone 12 from two points on opposite sides of the reactor. Axial air, if any, is carried directly to the axial reaction zone 14 by axial air conduit 26 through axial air control valve 28. The main fuel gas supply conduit 30 carries fuel gas from any suitable supply means to tangential fuel gas supply conduit 32 which, in turn, delivers tangential fuel gas to the tangential combustion zone 12 through tangential fuel gas control valve 34 and tangential fuel gas conduits 32A and 32B. Axial fuel gas, if any, is introduced into axial reaction zone 14 through axial fuel gas conduit 36 and axial fuel gas control valve 38. Conversion oil or other hydrocarbon feed to be converted into carbon black is introduced into the axial reaction zone 14 through conversion oil conduit 40.

In operation of the reactor 10, tangential air is introduced into tangential combustion zone 12 through conduits 22A and 22B at the same time as tangential fuel gas is introduced into tangential combustion zone 12 through tangential fuel gas conduits 32A and 32B, an the air and fuel gas thus introduced are combusted. Simultaneously conversion oil is introduced into the axial reaction zone 14 through conduit 40 and, in some cases, axial air from axial air conduit 26 or axial fuel gas from axial fuel gas conduit 36, or both, will also be introduced into the axial reaction zone 14. As the conversion oil from conversion oil conduit 40 passes downstream through axial reaction zone 14 past tangential reaction zone 12 it is surrounded by the vortex-like movement of the expanded gases resulting from the combustion of tangential air and tangential fuel gas. As the conversion oil and products of combustion from the tangential combustion zone continue down the axial reaction zone 14 the conversion oil is subjected to thermal cracking and is converted into carbon black by the heat of combustion generated in tangential combustion zone 12. By means not shown in the drawing but well known in the art, the carbon black reaction is quenched and the products of the reaction are carried away for separation of the desired carbon black product.

Additional standard reaction apparatus and control means known in the art but not directly related to the practice of the method or operation of the apparatus of the invention have been omitted from the drawing for the sake of simplicity and efficiency in describing the apparatus and method of the invention.

Information necessary to determine the temperature within tangential combustion zone 12 is obtained from the following measuring instruments, all of which are known in the art and are available from many automatic controller manufacturers and utilize mechanical or electrical energy or combinations of the two to represent their respective measurement signals:

A pressure transducer 42 establishes a signal 44 representative of the ambient atmospheric pressure at or near the ambient air intake 18.

A dew point transducer 46 is located at or near ambient air intake 18 and produces a signal 48 representative of the ambient dew point of the process air entering ambient air intake 18.

Temperature transducer 50 produces a signal 52 representative of the temperature of the tangential air passing through tangential air supply conduit 22.

Pressure transducer 54 produces a signal 56 representative of the pressure of the tangential air passing through tangential air supply conduit 22.

A flow transducer 58 produces a signal 60 representative of the rate of flow of tangential air through tangential supply conduit 22.

A chromatographic analyzer 62 produces a signal 64 representative of the relative composition of the tangential fuel gas flowing through tangential fuel gas supply conduit 32.

Temperature transducer 68 is productive of a signal 70 representative of the temperature of tangential fuel gas flowing through tangential fuel gas supply conduit 32.

Pressure transducer 72 produces a signal 74 representative of the pressure of the tangential gas flowing through tangential gas supply conduit 32.

Flow transducer 76 produces a signal 78 representative of the rate of flow of tangential fuel gas through tangential fuel gas supply conduit 32.

A flow recorder-controller 80, as known in the art, compares the signal 60 representative of the rate of flow of air through tangential air supply conduit 22 with a set point 82 and adjusts the tangential air control valve 24 in response to the difference between the actual tangential air flow rate as represented by signal 60 and the desired tangential air flow rate as represented by signal 82. Signal 82 can be a constant, preset signal or can be obtained as hereinafter described in conjunction with the disclosure of a preferred embodiment of the invention.

A flow recorder-controller 84, similar to recorder-controller 80, controls the flow of fuel gas through fuel gas supply conduit 32 in response to the difference between the signal 78 representing the actual flow rate of tangential fuel gas and the desired tangential fuel gas flow rate as represented by set point signal 86 which, during operation of the carbon black reactor 10 utilizing the method and apparatus of the invention, is obtained as hereinafter described.

Flow controllers performing the same control function as recorder-controllers 80 and 84 can be used in place of recorder-controllers 80 and 84 without altering the method or operation of the invention.

The apparatus schematically illustrated below the dashed line across the figure can be any means for accepting signals 44, 48, 52, 56, 60, 64, 70, 74, and 78 and utilizing the information contained in these signals to generate additional signals representative of information which can be used control the operation of the reactor 10. The means for performing the various signal conversions or comparisons can be mechanical, such as movement of mechanical linkages, or pneumatic, hydraulic, or other fluid means, or electrical, a a combination of mechanical and electrical, or any other means known for the utilization, transformation, or comparison of information-containing signals. Presently preferred means comprise electrical analog or digital computing means which are either programmed to perform the specified operations or are built and designed specifically to accept the input signals previously enumerated and to generate the desired set point signal 86.

Dew point temperature correction means 102 accepts signal 48 representative of the dew point temperature of the ambient air at the air intake 18 and signal 44 representative of the barometric pressure of the ambient air at air intake 18 and generates a signal 104 representative of the ratio of water vapor to dry air in the air received through air intake 18. It is within the scope of the invention to use dew point signal 48 as a representation of the ratio of water vapor to dry air. Use of a dew point correction means 102 is preferred, however, due to the fact that dew point transducer 46 operates by cooling a sample of ambient air to a temperature at which water droplets begin to form, thereby establishing the dew point temperature. Because the temperature at which water droplets will form in identical air samples at different barometric pressures will vary slightly, dew point correction means 102 is utilized to standardize the water vapor to dry air ratio signal 104 by imparting to the dew point signal 48 a correction for the ambient barometric pressure under which the dew point sample was tested. Information from which the amount of correction to be imparted by dew point correction means 102 can be determined may be obtained by accumulation of empirical data showing the effect of barometric pressure on dew point measure and subsequent curve fitting or other techniques productive of a suitable transfer function for the dew point correction means 102. Depending upon the prevailing climatic conditions in the geographic location at which reactor 10 is located, the amount of correction normally imparted by dew point correction means 102 may be so slight as to justify its omission from the control scheme. Wherever wide ranges of humidity or barometric pressure are likely to be encountered, however, its use is preferred.

Air flow rate standardization means 106 adjusts the tangential air flow rate signal 60 using information contained in the tangential air pressure signal 56 and the tangential air temperature signal 52 and generates a signal 108 representative of the standardized flow rate of air through tangential air supply conduit 22 in standard units of volume per unit time, standard cubic feet per hour, for example. Information necessary to provide air flow rate standardization means 106 with a transfer function to satisfactorily adjust the flow rate measured by transducer 58 at the pressure and temperature measured by transducers 54 and 50 respectively to a flow rate at a preselected standard temperature and pressure can be obtained from published gas tables.

Standard water vapor flow determination means 112 and standard dry air flow determination means 116 are productive of respective signals 114 representative of the standard flow rate of water vapor and 118 representative of the standard flow rate of dry air, both of which enter the tangential combusion zone 12 through tangential air supply conduit 22. Both the standard water vapor flow rate signal 114 and the standard dry air flow rate signal 118 are expressed in terms of standard units of volume per unit time, standard cubic feet per hour, for example. Standard water vapor flow determination means 112 is able to generate a signal representative of the standard water vapor flow rate 114 by multiplying the standard air flow rate signal 108 by a factor which can be determined directly from signal 104 representing the ratio of water vapor to dry air in the air supply. Similarly, the standard flow rate of dry air can be determined in the same general manner with provision made for inverting the water vapor-to-dry air ratio signal 104. An alternative method of obtaining the standard water vapor flow rate signal 114 and the standard dry air flow rate signal 118 is to establish either of these signals in the manner previously described and to subtractively determine the remaining signal utilizing the standard tangential air flow rate signal 108. For example, the standard water vapor flow rate determination means 112 could be used to produce a standard water vapor flow rate signal 114 and the standard dry air flow rate signal 118 could then be determined by subtracting signal 114 from signal 108.

Gas heating value determination means 120 is adapted to accept the signal 64 representative of the composition of the tangential fuel gas from chromatographic analyzer 62 and to generate a signal 122 representative of the heating value of the fuel gas flowing through tangential fuel gas conduit 32. The heating value of the fuel gas can be expressed in terms of energy units per standard unit of volume, BTU's (British thermal units) per standard cubic foot, for example, which the fuel gas will produce when completely combusted. One technique for deriving such a value from a chromatographic analysis is disclosed by R. L. Kindred et al in U.S. Pat. No. 3,095,728. Equivalent mechanical, analog, or digital techniques for generation of signal 122 are within the scope of the invention.

Gas flow rate standardization means 124 generates a standardized tangential fuel gas flow rate signal 126 in substantially the same manner that standard air flow determination means 106 generates signal 108 representative of the standard flow rate of tangential air. Using information which can be obtained from published gas tables, gas flow rate standardization means 124 adjusts the tangential fuel gas flow signal 78 provided by transducer signal 76 for difference in flow rate at a standard temperature and pressure and flow rate at the temperature and pressure inside tangential fuel gas supply conduit 32 as represented by signal 74 from pressure transducer 72 and signal 70 from temperature transducer 68. The standardized tangential gas flow rate signal can be expressed in standard units of volume per unit of time, standard cubic feet per hour, for example.

Tangential combustion zone temperature determination means 128 produces, from the tangential air temperature signal 52, the standard water vapor flow rate signal 114, the standard dry air flow rate signal 118, the tangential fuel gas heating value signal 122, the tangential fuel gas temperature signal 70, and the tangential fuel gas standard flow rate signal 126, a tangential combustion zone temperature signal 130 representative of the temperature within the tangential combustion zone 12 of reactor 10. The determination performed by tangential combustion zone temperature determination means 128 can be represented by the equation $$TCZT = C_1 + C_2(A) + C_3(G) + C_4(W) + C_5(TA) + C_6(TG) + C_7(QG) + C_8(A)(G) + C_9(A)(W) \quad (I)$$

Where $C_1, C_2, C_3, C_4, C_5, C_6, C_7, C_8,$ and $C_9$ are constants;
  $TCZT$ = Tangential combustion zone temperature (Signal 130);
  $A$ = Standard dry air flow rate (Signal 118);
  $G$ = Standard fuel gas flow rate (Signal 126);
  $W$ = Standard water vapor flow rate (Signal 114);
  $TA$ = Tangential air temperature (Signal 52);
  $TG$ = Tangential fuel gas temperature (Signal 70); and
  $QG$ = Heat content of tangential fuel gas (Signal 122).

One preferred equation which has been used to successfully generate an accurate combustion zone temperature is:

$$TCZT = B_1 + B_2(A) + B_3(G) + B_4(W) + B_5(TA) + B_6(TG) + B_7(QG) + B_8(A)(G) \quad (II)$$

Where
  $B_1, B_2, B_3, B_4, B_5, B_6, B_7$ and $B_8$ are constants;
  $TCZT$ = Tangential combustion zone temperature (Signal 130);
  $A$ = Standard dry air flow rate (Signal 118);
  $G$ = Standard fuel gas flow rate (Signal 126);
  $W$ = Standard water vapor flow rate (Signal 114);
  $TA$ = Tangential air temperature (Signal 52);
  $TG$ = Tangential fuel gas temperature (Signal 70); and
  $QG$ = Heat content of tangential fuel gas (Signal 122).

Constants $C_1 - C_9$ or $B_1 - B_8$ are chosen to provide proper scaling and tuning of the equation to the particular process being controlled.

These equations represent a simplification of the theoretical heat balance equation for tangential combustion zone 12 assuming complete combustion of the tangential fuel gas and negligible heat loss from the tangential combustion zone 12 other than by flow of hot gases from the tangential combustion zone 12 to the axial reaction zone 14. The accuracy of equations I and II has been verified by collection and analysis of empirical data utilizing a platinum thermocouple located within the tangential combustion zone 12 to measure the tangential combustion zone temperature directly.

Tangential combustion zone temperature signal 130 is received by signal comparison means 132 and is compared with a tangential combustion zone temperature set point 134 representative of the desired tangential combustion zone temperature for the particular reaction product desired. Comparison means 132 generates an error signal 136 representative of the difference between tangential combustion zone temperature signal 130 and tangential combustion zone temperature set point 134. The tangential combustion zone error signal 136 is appropriately modified by a proportional-integral controller 140 to establish a tangential gas flow rate set point signal 150 which can be supplied as set point signal 86 to the flow recorder-controller 84 and thereby control the flow of tangential fuel gas through tangential fuel gas supply conduit 32 permitted by tangential fuel gas supply valve 34. The proportional-integral controller 140, as with other components shown, can be mechanical, such as pneumatic, hydraulic or other mechanical means, or electrical, such as the analog representation illustrated or a digital equivalent thereof. The proportional-integral controller 140, whether mechanical or electrical, will have a proportional gain means 142, an integral gain means 144, an integrating means 146, and a summing means 148 for adding or combining the proportional and integral components derived from tangential combustion zone error signal 136 to generate a suitable set point signal 150. The values of the proportional gain generated by proportional gain means 142 and the integral gain generated by integral gain means 144 are tuned or matched to the specific reactor system to be controlled by means known in the art in order to make optimum use of the information contained in signal 136 to control the tangential fuel gas control valve 34.

As an alternative to control of the reactor 10 using the temperature of the tangential combustion zone 12, control based on a constant rate of heat release in the tangential combustion zone 12 can be used. In such a system, heat supply determination means 154 generates a signal 156 representative of the rate of supply of potential thermal energy to the tangential combustion zone 12 by multiplication of signal 122 representative of the heat content of the fuel gas being supplied to the combustion zone and signal 126 representative of the standard flow rate of fuel gas to the combustion zone. Signal 156 is therefore representative of the amount of energy per unit time delivered to tangential combustion zone 12 by the tangential fuel gas supply conduit 32. For example, if the gas heating value signal 122 is expressed in BTU's per standard cubic foot and signal 126 representing the standard flow rate of tangential fuel gas as expressed in standard cubic feet per hour, signal 156 will be representative of the BTU's per hour delivered to and generated in the tangential combustion zone 12, assuming complete combustion of the tangential fuel gas within the tangential combustion zone.

Comparison means 158 is utilized to compare signal 156 with a heat release rate set point 160 representative of the desired rate of energy flow into the tangential combustion zone 12 and generates a heat release rate error signal 162 representative of the difference between the heat release rate signal 156 and the heat release rate set point 160. A proportional-integral controller 164 similar to the controller 140 is utilized to convert heat release rate error signal 162 into a signal 174 which can be utilized as a set point 86 to flow recorder-controller 84 in controlling the amount of tangential fuel gas permitted by tangential fuel gas control valve 34 to pass through tangential fuel gas supply conduit 32. The proportional-integral controller 164 is equipped with proportional gain means 166, integral gain means 168, integrating means 170, and adding means 172. Proportional gain means 166 and integral gain means 168 are tuned as necessary to provide a signal 174 suitable for use of the set point to flow recorder-controller 84. Adding means 172 combines the proportional and integral factors derived by proportional-integral controller 164 from signal 162 thereby generating signal 174.

In an alternative embodiment of the invention, proportional-integral controller 140 is modified to provide a signal 150 which is utilized to modify set point 160 in response to tangential combustion zone temperature error signal 136. Operation in this manner permits control based primarily on the rate of heat release by the fuel gas supplied to the tangential combustion zone 12 with a variation in heat release rate set point 160 provided in response to an unwanted variation in tangential combustion zone temperature.

In a preferred embodiment of the invention, switching means 178 is provided to select among generated signal 134, generated signal 150, and a predetermined set point 176. Switching means 178 is preferably an automatic mechanical or electrical means which will select one of the three signals in response to one or more preselected conditions. For example, switching means 178 may be adapted to switch from signal 174 to signal 150 whenever certain weather conditions or reaction conditions were found to exist, and may switch from signal 150 to signal 174 under other conditions in an analogous fashion, or could switch to signal 174 whenever a malfunction or mechanical breakdown occurs in controller 140. Other examples of operation of the switching means 178 would be to switch to preselected set point 176 if signals 150 and 174 both exceed acceptable limits. The signal selected by switching means 178 is provided to one terminal of manual switching means 180 which can select between the set point provided by switching means 178 and a manual set point 182. By means of manual switching means 180 and switching means 178 flow recorder-controller 84 is provided with a set point 86 which is the same as signal 150, signal 174, signal 176, or signal 182, depending on the selections made by switches 180 and 178.

As an alternative to providing a fixed tangential air flow rate set point 82 to flow recorder-controller 80, a signal derived from the standardized air flow rate signal 108 or from the standardized dry air flow rate signal 118 can be utilized as the air flow rate set point 82 in order to achieve a constant standard flow rate of air to tangential combustion zone 12 despite changes in ambient atmospheric conditions or other circumstances which would alter the amount of oxygen contained in a constant uncorrected flow rate of tangential air. As another alternative, the tangential air flow set point 82 can be derived from the standardized fuel gas flow rate signal 126 and standard air flow rate 108 or standard dry air flow rate 118 in order to provide a desired ratio between standard air flow and standard gas flow.

Operation of a carbon black reactor 10 utilizing the method and apparatus of the invention permits continuous operation of the reactor to produce a carbon black product having specific desired characteristics despite changes in ambient atmospheric conditions, fuel gas composition, and other similar disturbances which have heretofore resulted in the production of off-specification product. Such control is accomplished without adding any material to the air or fuel gas streams and without removing any material from the air or fuel gas streams, although the invention can be adapted by those skilled in the art to operate using, for example, oxygen-enriched tangential air.

In operation, the method and apparatus of the invention are capable of maintaining a desired tangential combustion zone temperature as indicated by the following example.

EXAMPLE

In one control system utilizing equation II for determination of the tangential combustion zone temperature in degrees Fahrenheit where the standard dry air flow rate, standard gas flow rate, and standard water vapor flow rate were expressed in standard cubic feet per hour; tangential air temperature and tangential fuel gas temperature were expressed in degrees Fahrenheit; and heat content of tangential fuel gas was expressed in BTU's per hour, values for the constants of equation II were:

$B_1 = -792.6671$
$B_2 = -0.004238602$
$B_3 = 0.3388394$
$B_4 = 0.01403839$
$B_5 = 0.7566949$
$B_6 = 0.08348556$
$B_7 = 2.074226$
$B_8 = -0.0000008400752$

The eight reactors controlled by the system using the method and apparatus of the invention, with signal 150 selected as the set point 86 to recorder-controller 84, ordinarily utilize natural gas comprising primarily methane as a fuel gas. Due to fluctuations in supply and availability of this gas, it is often necessary to utilize "wet" gas from which the heavier constituents have not been removed (thus exhibiting a greater heating value) in order to maintain continuous operation of the carbon black reactors. Prior to installation of the method and apparatus of the invention, changing from the preferred gas to "wet" gas or from "wet" gas to the preferred gas resulted in an unavoidable period of off-specification production. After installation of the method of apparatus of the invention, changing from one gas source to the other was accomplished without the production of carbon black outside acceptable specification ranges. In addition, other variations in fuel gas pressure, temperature, or composition and both rapid and gradual changes in ambient atmospheric conditions as well as other similar disturbances encountered failed to result in a change in the temperature of tangential combustion zone 12 or the production of off-specification product.

Modification of the method and apparatus of the invention to control a reactor utilizing a liquid combustion zone fuel could be accomplished by persons reasonably skilled in the art by substituting other heating value measurement means, such as a bomb calorimeter or liquid chromatograph for chromatograph 62 and by determining a standard flow of fuel oil for use as signal 126 based on the uncorrected flow rate and temperature of the fuel flowing to the combustion zone.

Other modifications and alterations of this invention will become apparent to those skilled in the art from the foregoing discussion and accompanying drawing, and it should be understood that this invention is not to be unduly limited thereto.

We claim:

1. In a process for the preparation of carbon black in a reaction zone of a carbon black reactor wherein air and fuel gas are injected into a combustion zone and a hydrocarbon feedstock is decomposed by hot combustion gases formed from burning said fuel gas with said air in said combustion zone, a method of controlling the temperature within said combustion zone, said method comprising:
   a. establishing, in response to characteristics of both air and fuel gas injected into said combustion zone, a flame temperature signal representative of the temperature within said combustion zone;
   b. comparing, by electrical or mechanical means, said flame temperature signal with a flame temperature set point signal representative of the desired temperature within said combustion zone to generate a flame temperature error signal; and
   c. controlling the flow rate of said fuel gas being injected into said combustion zone in response to said flame temperature error signal.

2. A method in accordance with claim 1 wherein the step of establishing a flame temperature signal representative of the temperature within said combustion zone comprises:
   a. measuring the temperature of the air entering said combustion zone and establishing a first signal representative thereof;
   b. establishing a second signal representative of the standardized flow rate of water vapor to said combustion zone;
   c. establishing a third signal representative of the standardized flow rate of dry air to said combustion zone;
   d. establishing a fourth signal representative of the heating value of the fuel gas entering said combustion zone;
   e. measuring the temperature of the fuel entering said combustion zone and establishing a fifth signal representative thereof;
   f. establishing a sixth signal representative of the standardized flow rate of fuel gas into said combustion zone; and
   g. generating by electrical or mechanical means a flame temperature signal equal to:

$$B_1 + B_2(A) + B_3(G) + B_4(W) + B_5(TA) + B_6(TG) + B_7(QG) + B_8(A)(G)$$

where
   $B_1, B_2, B_3, B_4, B_5, B_6, B_7$, and $B_8$ are constants,
   $A$ = said third signal,
   $G$ = said sixth signal,
   $W$ = said second signal,
   $TA$ = said first signal,
   $TG$ = said fifth signal, and
   $QG$ = said fourth signal.

3. A method in accordance with claim 2 wherein the step of controlling the flow rate of fuel gas to said combustion zone in response to said flame temperature error signal comprises:
   a. generating from said flame temperature error signal a proportional signal and an integral signal;
   b. combining, by mechanical or electrical means, said proportional signal and said integral signal to generate a controller set point signal; and
   c. transmitting said controller set point signal to a flow controller which adjusts the rate of flow of fuel gas entering said combustion zone in response thereto.

4. A method in accordance with claim 3 additionally comprising adjusting the flow rate of air to said combustion zone to maintain said third signal at a substantially constant value.

5. A method in accordance with claim 3 additionally comprising adjusting the flow rate of air to said combustion zone to maintain the ratio between said third signal and said sixth signal at a substantially constant value.

6. In a process for the preparation of carbon black in a reaction zone of a carbon black reactor wherein air and fuel are injected into a combustion zone and a hydrocarbon feedstock is decomposed by hot combustion gases formed from burning said fuel with said air in said combustion zone, method of controlling the amount of heat generated in said combustion zone, said method comprising:
   a. establishing, in response to characteristics of said fuel injected into said combustion zone, a heat release rate signal representative of the rate at which available energy is introduced into said combustion zone by said fuel;
   b. comparing, by electrical or mechanical means, said heat release rate signal with a heat release rate set point signal representative of the desired heat release rate within said combustion zone to generate a heat release rate error signal; and
   c. controlling the flow rate of said fuel being injected into said combustion zone in response to said heat release rate error signal.

7. A method in accordance with claim 6 additionally comprising:
   a. establishing, in response to characteristics of both air and fuel injected into said combustion zone, a flame temperature signal representative of the temperature within said combustion zone;
   b. comparing, by electrical or mechanical means, said flame temperature signal with a flame temperature set point signal representative of the desired temperature within said combustion zone to generate a flame temperature error signal; and
   c. adjusting said heat release rate set point signal in response to said flame temperature error signal.

* * * * *